(12) United States Patent
Osada et al.

(10) Patent No.: US 11,912,853 B2
(45) Date of Patent: Feb. 27, 2024

(54) BINDER COMPOSITION, METHOD OF PRODUCING BINDER COMPOSITION, AND METHOD OF PRODUCING ALL-SOLID-STATE BATTERY

(71) Applicants: TOYOTA JIDOSHA KABUSHIKI KAISHA, Toyota (JP); KUREHA CORPORATION, Tokyo (JP)

(72) Inventors: Naoki Osada, Toyota (JP); Shohei Kawashima, Toyota (JP); Ryosuke Furuya, Toyota (JP); Yoshiyuki Nagasawa, Tokyo (JP); Mitsuyasu Sakuma, Tokyo (JP)

(73) Assignees: TOYOTA JIDOSHA KABUSHIKI KAISHA, Toyota (JP); KUREHA CORPORATION, Tokyo (JP)

( * ) Notice: Subject to any disclaimer, the term of this patent is extended or adjusted under 35 U.S.C. 154(b) by 60 days.

(21) Appl. No.: 17/339,026

(22) Filed: Jun. 4, 2021

(65) Prior Publication Data
US 2021/0380791 A1    Dec. 9, 2021

(30) Foreign Application Priority Data
Jun. 9, 2020  (JP) ................. 2020-099959

(51) Int. Cl.
*C08L 27/16* (2006.01)
*H01M 4/62* (2006.01)
(Continued)

(52) U.S. Cl.
CPC ................ *C08L 27/16* (2013.01); *C08J 3/28* (2013.01); *H01M 4/623* (2013.01);
(Continued)

(58) Field of Classification Search
CPC ... C08L 27/16; H01M 50/403; H01M 50/449; H01M 4/623; H01M 10/0525; H01M 10/0562; H01M 2300/0068; C08J 3/28
See application file for complete search history.

(56) References Cited

U.S. PATENT DOCUMENTS

| 2015/0325834 | A1 | 11/2015 | Kato |
| 2015/0380763 | A1* | 12/2015 | Ohtomo ................ H01M 4/134 429/304 |
| 2019/0296393 | A1 | 9/2019 | Watanabe |

FOREIGN PATENT DOCUMENTS

| CN | 101867070 A | 10/2010 |
| CN | 109546207 A | 3/2019 |

(Continued)

OTHER PUBLICATIONS

English machine translation of Saturo (JP 2002298851 A) (Year: 2002).*

*Primary Examiner* — Stewart A Fraser
(74) *Attorney, Agent, or Firm* — Dickinson Wright, PLLC

(57) ABSTRACT

A binder composition includes a dispersion medium and a group of binder particles. The group of binder particles is dispersed in the dispersion medium. The group of binder particles include a polymer material. The polymer material includes a constitutional unit originated from vinylidene difluoride. The group of binder particles has a number-based particle size distribution. The particle size distribution satisfies the following conditions: "$0.19 \leq X \leq 0.26$", "$0.69 \leq Y \leq 0.76$", and "$0 \leq Z \leq 0.05$". Here, "X" represents a frequency of particles each having a particle size of less than or equal to 40 μm. "Y" indicates a frequency of particles each having a particle size of more than 40 μm and less than or equal to 110 μm. "Z" indicates a frequency of particles each having a particle size of more than 110 μm and less than or equal to 250 μm.

5 Claims, 8 Drawing Sheets

(51) Int. Cl.
  *H01M 10/0525* (2010.01)
  *H01M 50/403* (2021.01)
  *H01M 50/449* (2021.01)
  *C08J 3/28* (2006.01)
  *H01M 10/0562* (2010.01)

(52) U.S. Cl.
  CPC ... *H01M 10/0525* (2013.01); *H01M 10/0562* (2013.01); *H01M 50/403* (2021.01); *H01M 50/449* (2021.01); *H01M 2300/0068* (2013.01)

(56) References Cited

FOREIGN PATENT DOCUMENTS

| | | | |
|---|---|---|---|
| CN | 110299560 A | | 10/2019 |
| JP | 2002298851 A | * | 10/2002 |
| JP | 2012151096 A | | 8/2012 |
| JP | 2013218926 A | | 10/2013 |
| WO | 2014010042 A1 | | 1/2014 |

* cited by examiner

BINDER COMPOSITION, METHOD OF PRODUCING BINDER COMPOSITION, AND METHOD OF PRODUCING ALL-SOLID-STATE BATTERY

This nonprovisional application is based on Japanese Patent Application No. 2020-099959 filed on Jun. 9, 2020, with the Japan Patent Office, the entire contents of which are hereby incorporated by reference.

BACKGROUND

Field

The present disclosure relates to a binder composition, a method of producing a binder composition, and a method of producing an all-solid-state battery.

Description of the Background Art

Japanese Patent Laying-Open No. 2012-151096 discloses a binder including a repeating unit that is based on vinylidene difluoride.

SUMMARY

A sulfide-based solid electrolyte is promising as a separator material for an all-solid-state battery. This is because the sulfide-based solid electrolyte can have a high ionic conductance. A separator of the all-solid-state battery can be, for example, a slurry-applied film. That is, the sulfide-based solid electrolyte and a binder composition can be mixed to prepare a slurry composition. The slurry composition can be applied to a surface of a substrate and dried to form the separator.

The binder composition includes a dispersion medium and a group of binder particles (dispersoid). The group of binder particles includes a polymer material. The polymer material can include a constitutional unit originated from vinylidene difluoride (VDF).

A granular aggregate may be generated in the slurry composition. The aggregate may be a composite body of the sulfide-based solid electrolyte and the group of binder particles. It is considered that the aggregate is formed by, for example, an interaction between the sulfide-based solid electrolyte and the group of binder particles. The aggregate can cause variation in the thickness of the separator. For example, large growth of the aggregate may cause variation in the thickness of the separator. For example, when a frequency of generation of aggregates is increased, variation may be caused in the thickness of the separator.

Large variation in the thickness of the separator may lead to, for example, increased discharging resistance of the all-solid-state battery. This is presumably because a discharging reaction becomes non-uniform.

It is an object of the present disclosure to provide a binder composition by which an aggregate is less likely to be formed in a slurry composition including a sulfide-based solid electrolyte.

Hereinafter, technical configuration and function mechanism of the present disclosure will be described. However, the function mechanism of the present disclosure includes presumption. Whether or not the function mechanism is correct does not limit the scope of the claims.

[1] A binder composition includes: a dispersion medium; and a group of binder particles. The group of binder particles is dispersed in the dispersion medium. The group of binder particles includes a polymer material. The polymer material includes a constitutional unit originated from vinylidene difluoride. The group of binder particles has a number-based particle size distribution.

The number-based particle size distribution satisfies conditions of the following formulae (1) to (3):

$$0.19 \leq X \leq 0.26 \quad (1),$$

$$0.69 \leq Y \leq 0.76 \quad (2), \text{ and}$$

$$0 \leq Z \leq 0.05 \quad (3).$$

Here, in the formula (1), "X" represents a frequency of particles each having a particle size of less than or equal to 40 μm.

In the formula (2), "Y" represents a frequency of particles each having a particle size of more than 40 μm and less than or equal to 110 μm.

In the formula (3), "Z" represents a frequency of particles each having a particle size of more than 110 μm and less than or equal to 250 μm.

In the binder composition of the present disclosure, the group of binder particles has the specific particle size distribution. That is, the particle size distribution of the group of binder particles satisfies the conditions of the above-described formulae (1) to (3). When the conditions of the formulae (1) to (3) are satisfied, an aggregate tends to be less likely to be formed in the slurry composition including the sulfide-based solid electrolyte, although details of the mechanism thereof are unknown.

[2] In the binder composition according to [1], the dispersion medium may include, for example, butyl butyrate.

The butyl butyrate tends to have low reactivity with respect to the sulfide-based solid electrolyte. Since the dispersion medium includes the butyl butyrate, it is expected that an aggregate is less likely to be formed in the slurry composition including the sulfide-based solid electrolyte.

[3] A method of producing a binder composition includes (a) and (b) as follows.

(a) A binder composition is prepared by mixing a dispersion medium with a group of binder particles.

(b) The group of binder particles is dispersed by stirring the binder composition.

The group of binder particles includes a polymer material. The polymer material includes a constitutional unit originated from vinylidene difluoride. The binder composition is stirred to maintain the binder composition at a temperature of more than or equal to 40° C. and less than or equal to 55° C.

By the stirring, mechanical energy is applied to the binder composition. This can lead to an increased temperature of the binder composition. On this occasion, by adjusting the stirring condition to maintain the binder composition at a temperature of more than or equal to 40° C. and less than or equal to 55° C., it is expected to form the particle size distribution described in [1]. Also, it is expected to improve binding force of the group of binder particles.

[4] In the method of producing the binder composition according to [3], for example, the binder composition may be stirred to maintain the binder composition at a temperature of more than or equal to 45° C. and less than or equal to 55° C.

Thus, it is expected that an aggregate is less likely to be formed in the slurry composition including the sulfide-based solid electrolyte.

[5] In the method of producing the binder composition according to [3] or [4], the binder composition may be stirred by, for example, ultrasonic wave.

The ultrasonic wave can be suitable for the dispersing process in the present disclosure.

[6] A method of producing an all-solid-state battery includes (A) to (D) as follows.

(A) A slurry composition is prepared by mixing the binder composition according to [1] or [2] with a sulfide-based solid electrolyte.

(B) An aggregate included in the slurry composition is pulverized.

(C) A separator is formed by applying the slurry composition to a surface of a substrate and drying the slurry composition after pulverizing the aggregate.

(D) An all-solid-state battery including the separator is produced.

According to the method of producing the all-solid-state battery according to [6], it is expected to reduce the discharging resistance of the all-solid-state battery. This is presumably because variation in the thickness of the separator is reduced by reducing aggregates.

[7] In the method of producing the all-solid-state battery according to [6], the sulfide-based solid electrolyte may have a specific surface area of, for example, less than or equal to 5.3 $m^2/g$.

Since the sulfide-based solid electrolyte has a specific surface area of less than or equal to 5.3 $m^2/g$, it is expected to attain small aggregating force of the sulfide-based solid electrolyte.

[8] In the method of producing the all-solid-state battery according to [6] or [7], for example, the aggregate may be pulverized to maintain the slurry composition at a temperature of less than or equal to 50° C.

Mechanical energy is applied to the slurry composition to pulverize the aggregate. This can lead to an increased temperature of the slurry composition. On this occasion, by adjusting the pulverizing condition to avoid the temperature of the slurry composition from being more than 50° C., it is expected that re-aggregation after the pulverizing is less likely to occur.

[9] In the method of producing the all-solid-state battery according to any one of [6] to [8], the aggregate may be pulverized by, for example, ultrasonic wave.

The ultrasonic wave can be suitable for the pulverizing process in the present disclosure.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
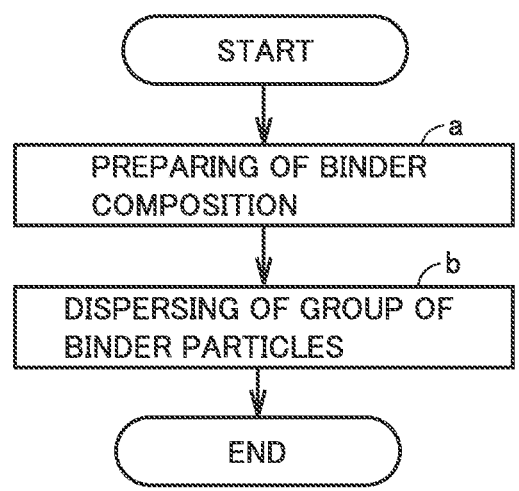
FIG. 1 is a schematic flowchart of a method of producing a binder composition according to the present embodiment.

Hereinafter, an embodiment of the present disclosure (hereinafter, also referred to as "the present embodiment") will be described. However, the description below does not limit the scope of the claims.

In the present embodiment, for example, the expression "0.1 part by mass to 10 parts by mass" or the like indicates a range including the boundary values unless otherwise noted. For example, the expression "0.1 part by mass to 10 parts by mass" indicates a range of "more than or equal to 0.1 part by mass and less than or equal to 10 parts by mass".

<Binder Composition>

A binder composition of the present embodiment can be used, for example, to form a separator of an all-solid-state battery. However, the binder composition of the present embodiment can be applied to any application. The binder composition of the present embodiment may be used, for example, to form an electrode of the all-solid-state battery.

The binder composition includes a dispersion medium and a group of binder particles. The binder composition may also be referred to as a "binder fluid dispersion (dispersion)" or the like. The binder composition may consist essentially of the dispersion medium and the group of binder particles. For example, the binder composition may consist of: less than or equal to 15 mass % of the group of binder particles; and the remainder of the dispersion medium. Since the mass fraction of the group of binder particles is less than or equal to 15 mass %, an appropriate degree of fluidity and dispersion stability are expected. For example, the binder composition may consist of: 1 mass % to 15 mass % of the group of binder particles; and the remainder of the dispersion medium. For example, the binder composition may consist of: 5 mass % to 15 mass % of the group of binder particles; and the remainder of the dispersion medium. For example, the binder composition may consist of: 10 mass % to 15 mass % of the group of binder particles; and the remainder of the dispersion medium.

<<Dispersion Medium>>

The dispersion medium is a liquid. The dispersion medium can include any component. The dispersion medium may include, for example, a carboxylic acid ester or the like. For example, the dispersion medium may include at least one selected from a group consisting of ethyl acetate, butyl acetate, butyl butyrate, pentyl butyrate, hexyl butyrate, butyl pentanoate, pentyl pentanoate, hexyl pentanoate, butyl hexanoate, pentyl hexanoate, and hexyl hexanoate. That is, the dispersion medium may include butyl butyrate, for example. For example, the dispersion medium may consist essentially of butyl butyrate. The butyl butyrate tends to have low reactivity with respect to the sulfide-based solid electrolyte.

<<Group of Binder Particles>>

The group of binder particles is a dispersoid. The group of binder particles is dispersed in the dispersion medium. The group of binder particles serves to bind matters to each other.

(Polymer Material)

In the group of binder particles, each of the particles includes a polymer material. That is, the group of binder particles includes the polymer material. Each of the particles may consist essentially of the polymer material. That is, the group of binder particles may consist essentially of the polymer material.

The polymer material includes a constitutional unit originated from vinylidene difluoride (VdF). The "constitutional unit" in the present embodiment represents an atomic group that constitutes a part of a basic structure of a polymer chain. The minimum constitutional unit repeated to constitute a regular molecular chain is particularly referred to as "constitutional repeating unit".

The polymer material may be, for example, a homopolymer. That is, the polymer material may be, for example, polyvinylidene difluoride (PVdF). The PVdF consists essentially of the constitutional repeating unit originated from VdF.

The polymer material may be, for example, a copolymer. That is, the polymer material may include a constitutional unit other than the constitutional unit originated from VdF. For example, the copolymer may be a random copolymer, an alternating copolymer, a block copolymer, or a graft copolymer.

For example, the polymer material may include: the constitutional unit originated from VdF; and a constitutional unit originated from hexafluoropropylene (HFP). For example, the polymer material may include: the constitutional unit originated from VdF; and a constitutional unit originated from tetrafluoroethylene (TFE). For example, the polymer material may include: the constitutional unit originated from VdF; the constitutional unit originated from HFP; and the constitutional unit originated from TFE.

For example, the polymer material may consist essentially of: the constitutional unit originated from VdF; and the constitutional unit originated from HFP. For example, the polymer material may consist essentially of: the constitutional unit originated from VdF; and the constitutional unit originated from TFE. For example, the polymer material may consist essentially of: the constitutional unit originated from VdF; the constitutional unit originated from HFP; and the constitutional unit originated from TFE.

The polymer material may be represent by, for example, the following formula:

—[$CH_2CF_2$]$_p$—[$CF_2CF(CF_3)$]$_q$—[$CF_2CF_2$]$_r$—

In the formula, "p" represents an amount of substance fraction (mol %) of the constitutional unit originated from VdF. In the above formula, "q" represents an amount of substance fraction of the constitutional unit originated from HFP. In the above formula, "r" represents an amount of substance fraction of the constitutional unit originated from TFE. For example, "p, q, and r" may satisfy the following relation: "$50 \leq p \leq 100$, $0 \leq q \leq 50$, $0 \leq r \leq 50$, and p+q+r=100". For example, "p, q, and r" may satisfy the following relation: "$60 \leq p \leq 90$, $10 \leq q \leq 40$, r=0, p+q+r=100". For example, "p, q, and r" may satisfy the following relation: "$75 \leq p \leq 90$, $10 \leq q \leq 25$, r=0, and p+q+r=100". The amount of substance fraction of each constitutional unit can be calculated in accordance with the $^{19}$F-NMR (fluorine-19 nuclear magnetic resonance) spectrum of the polymer material.

The molecular weight of the polymer material can be measured by, for example, a GPC (gel permeation chromatography) method. The polymer material may have a weight average molecular weight (standard polystyrene equivalent value) of 100,000 to 2,000,000, for example. The polymer material may have a weight average molecular weight (standard polystyrene equivalent value) of 500,000 to 1,500,000, for example.

(Particle Size Distribution)

The group of binder particles is a collection (powder) of solid particles. The group of binder particles of the present embodiment has a specific particle size distribution. The particle size distribution is a number-based particle size distribution. The particle size distribution satisfies the conditions of the following formulae (1) to (3):

$$0.19 \leq X \leq 0.26 \quad (1),$$

$$0.69 \leq Y \leq 0.76 \quad (2), \text{ and}$$

$$0 \leq Z \leq 0.05 \quad (3).$$

In the formula (1), "X" represents a frequency of particles each having a particle size of less than or equal to 40 μm.

In the formula (2), "Y" represents a frequency of particles each having a particle size of more than 40 μm and less than or equal to 110 μm.

In the formula (3), "Z" represents a frequency of particles each having a particle size of more than 110 μm and less than or equal to 250 μm.

When the conditions of (1) to (3) are satisfied, an aggregate tends to be less likely to be formed in the slurry composition including the sulfide-based solid electrolyte.

(Method of Measuring Particle Size Distribution)

In the present embodiment, the particle size distribution of the group of binder particles is measured in the following procedure.

The binder composition to be measured is prepared. The binder composition is diluted or condensed to attain a mass fraction of 10 mass % of the group of binder particles in the binder composition.

After adjusting the mass fraction, a coloring agent is added to the binder composition. The group of binder particles is colored by the coloring agent.

After the coloring, a predetermined amount of the binder composition is placed on a petri dish. On the petri dish, the dispersion medium is substantially removed by natural drying.

After the drying, an image of the group of binder particles on the petri dish is obtained by a digital microscope. A visual field range is "about 8 mm×10 mm".

The image is binarized by image processing software. For example, image processing software such as "Image J" (free software) may be used.

After the binarization, the number of particles in the image is counted. Further, the particle size of each particle in the image is measured. The particle size in the present embodiment is an equivalent circle diameter. The "equivalent circle diameter" in the present embodiment indicates the diameter of a perfect circle corresponding to the area of the particle in the image.

Frequency "X" is calculated by dividing the number of the particles each having a particle size of less than or equal to 40 μm by the total number of the particles. Frequency "Y" is calculated by dividing the number of the particles each having a particle size of more than 40 μm and less than or equal to 110 μm by the total number of the particles. Frequency "Z" is calculated by dividing the number of the particles each having a particle size of more than 110 μm and less than or equal to 250 μm by the total number of the particles.

<Method of Producing Binder Composition>

FIG. 1 is a schematic flowchart of a method of producing the binder composition according to the present embodiment.

The method of producing the binder composition includes "(a) preparing of the binder composition" and "(b) dispersing of the group of binder particles".

In the present embodiment, "(a) the preparing of the binder composition" and "(b) the dispersing of the group of binder particles" may be performed sequentially. Further, "(a) the preparing of the binder composition" and "(b) the dispersing of the group of binder particles" may be performed substantially simultaneously. A resting time may be provided between "(a) the preparing of the binder composition" and "(b) the dispersing of the group of binder particles".

<<(a) Preparing of Binder Composition>>

The method of producing the binder composition according to the present embodiment includes preparing the binder composition by mixing the dispersion medium with the group of binder particles.

The dispersion medium is prepared. Details of the dispersion medium are described above. The group of binder particles is prepared. The group of binder particles includes the above-described polymer material. In this stage, the group of binder particles may have a median size of, for example, 10 μm to 500 μm. The "median size" indicates the particle size of a particle corresponding to 50% of the cumulative number of the particles from the one with the smallest particle size with respect to the total number of the particles in the number-based particle size distribution.

A predetermined container is prepared. The container may be composed of glass, for example. A predetermined amount of the dispersion medium and a predetermined amount of the group of binder particles are introduced into the container. The mass fraction of the group of binder particles may be, for example, more than or equal to 1 mass % and less than or equal to 15 mass % with respect to the total of the dispersion medium and the group of binder particles.

After introducing the materials into the container, the materials may be rested. A resting time may be, for example, more than or equal to 1 hour. The resting time may be, for example, more than or equal to 4 hours. The resting time may be, for example, more than or equal to 8 hours. The resting time may be, for example, less than or equal to 48 hours.

<<(b) Dispersing of Group of Binder Particles>>

The method of producing the binder composition according to the present embodiment includes dispersing the group of binder particles by stirring the binder composition.

In the present embodiment, any stirrer or dispersing device may be used. For example, a commercially available ultrasonic homogenizer or the like may be used. That is, the binder composition may be stirred by ultrasonic wave.

In the present embodiment, the temperature of the binder composition is managed during the stirring. That is, the binder composition is stirred to maintain the binder composition at a temperature of more than or equal to 40° C. and less than or equal to 55° C. For example, first, the binder composition is stirred until the temperature of the binder composition becomes more than or equal to 40° C. When the temperature becomes more than or equal to 40° C., the stirring is continued for a predetermined time so as to avoid the temperature from being more than 55° C.

For example, a stirring condition may be adjusted to avoid the temperature of the binder composition from being more than 55° C. Examples of the stirring condition may include a rotation speed of a rotary stirrer, a shape of a stirring blade, a vibration frequency of an ultrasonic dispersing device, a stirring time, and the like. For example, the binder composition may be cooled by a chiller or the like.

A stirring time may be, for example, more than or equal to 6 minutes. The stirring time may be, for example, more than or equal to 12 minutes. The stirring time may be, for example, more than or equal to 24 minutes. The stirring time may be, for example, more than or equal to 60 minutes. The stirring time may be, for example, less than or equal to 180 minutes. The stirring time may be, for example, less than or equal to 120 minutes.

By managing the temperature of the binder composition to fall within the range of more than or equal to 40° C. and less than or equal to 55° C., an expected particle size distribution can be formed. The binder composition may be stirred to maintain the binder composition at a temperature of more than or equal to 45° C. and less than or equal to 55° C. Thus, it is expected that an aggregate is less likely to be formed in the slurry composition including the sulfide-based solid electrolyte.

Figure 2:
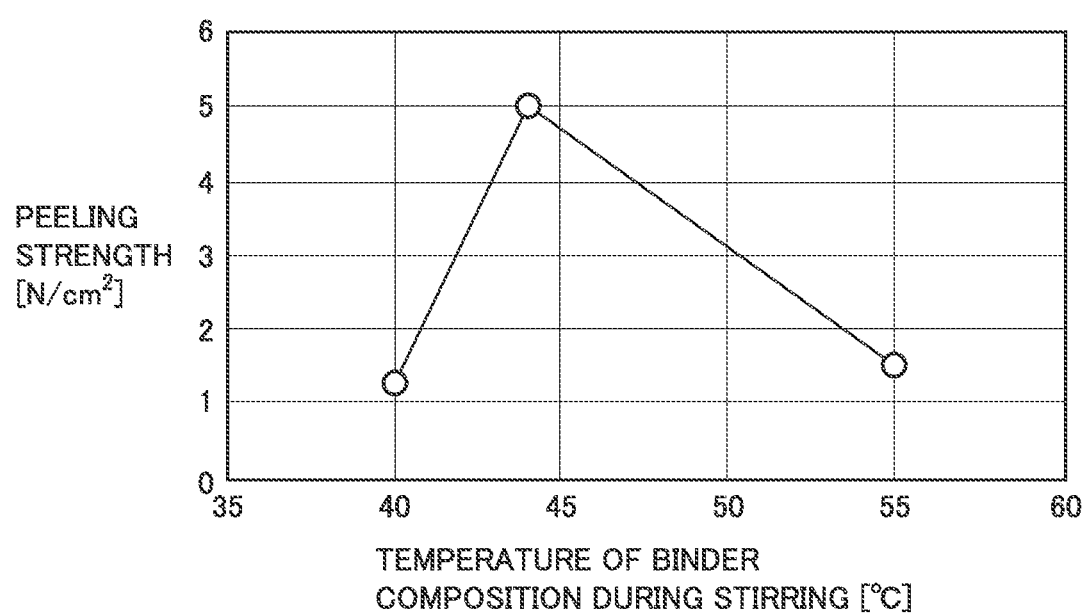
FIG. 2 is a graph showing a relation between a temperature of a binder composition and binding force.

FIG. 2 is a graph showing a relation between the temperature of the binder composition and binding force.

The horizontal axis of FIG. 2 represents the temperature of the binder composition during the stirring. The vertical axis represents peeling strength of the separator. It is considered that as the peeling strength is higher, the binding force of the group of binder particles is larger. The "peeling strength" in the present embodiment is measured through a peeling test.

Figure 8:
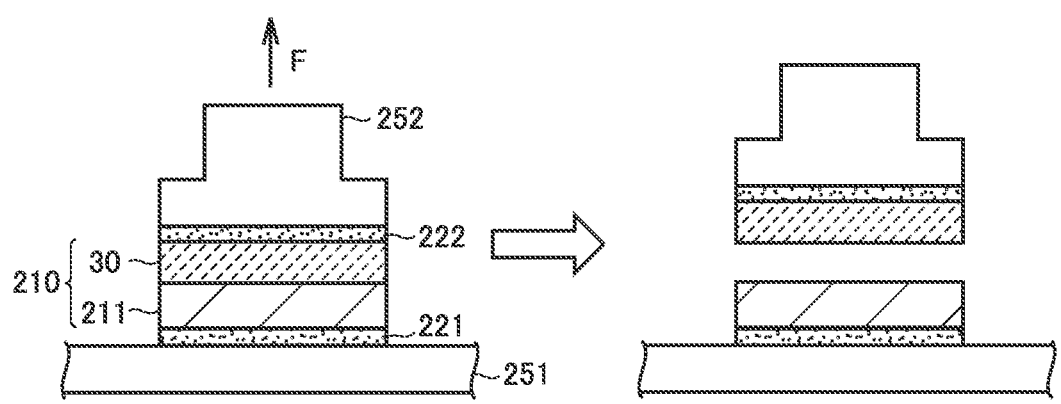
FIG. 8 is an explanatory diagram for a peeling test.

FIG. 8 is an explanatory diagram for the peeling test.

First, a separator 30 (slurry-applied film) is formed on a surface of a substrate 211. Substrate 211 is a metal foil. A sample piece 210 is sampled by a punching device. Sample piece 210 consists of substrate 211 and separator 30. The planar shape of sample piece 210 is a circular shape. Sample piece 210 has an area of 1 cm$^2$. Substrate 211 is fixed to a sample stage 251 by a first double-sided tape 221.

A load measurement device is prepared. For example, a "digital force gauge" manufactured by IMADA or an equivalent device is prepared. A measurement jig 252 of the load measurement device and separator 30 are fixed by a second double-sided tape 222. Measurement jig 252 is separated from sample stage 251 in a direction perpendicular to the surface of sample stage 251. On this occasion, force applied to measurement jig 252 is measured. The maximum force until separator 30 is peeled from substrate 211 is measured. A value obtained by dividing the maximum force by the area of sample piece 210 is regarded as "peeling strength".

It should be noted that the "peeling strength between first double-sided tape 221 and sample stage 251", the "peeling strength between first double-sided tape 221 and substrate 211", the "peeling strength between second double-sided tape 222 and measurement jig 252", and the "peeling strength between second double-sided tape 222 and separator 30" are sufficiently larger than the "peeling strength between separator 30 and substrate 211".

In FIG. 2, it is observed that the binding force tends to be improved in the range of more than or equal to 40° C. and less than or equal to 55° C. The temperature of the binder composition during the stirring may be, for example, more than or equal to 40° C. and less than or equal to 50° C. The temperature of the binder composition during the stirring may be, for example, more than or equal to 40° C. and less than or equal to 45° C. The temperature of the binder composition during the stirring may be, for example, more than or equal to 45° C. and less than or equal to 50° C. The temperature of the binder composition during the stirring may be, for example, more than or equal to 50° C. and less than or equal to 55° C.

<Method of Producing All-Solid-State Battery>

Figure 3:
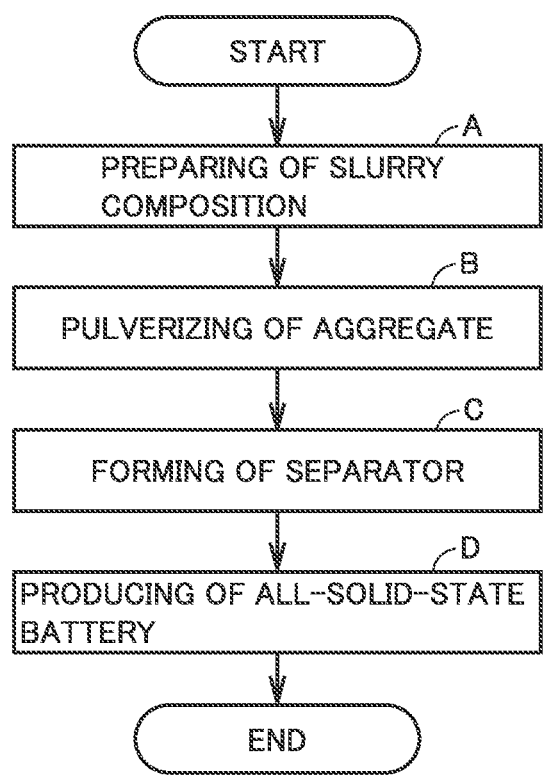
FIG. 3 is a schematic flowchart of a method of producing an all-solid-state battery according to the present embodiment.

FIG. 3 is a schematic flowchart of a method of producing an all-solid-state battery according to the present embodiment.

The method of producing the all-solid-state battery according to the present embodiment includes "(A) preparing of the slurry composition", "(B) pulverizing of the aggregate", "(C) forming of the separator", and "(D) producing of the all-solid-state battery".

<<(A) Preparing of Slurry Composition>>

The method of producing the all-solid-state battery according to the present embodiment includes preparing the slurry composition by mixing the binder composition with the sulfide-based solid electrolyte.

A predetermined container is prepared. The container may be composed of polyethylene (PE), for example. The container may be composed of polypropylene (PP), for example. A predetermined amount of the binder composition and a predetermined amount of the sulfide-based solid electrolyte are introduced into the container. For example, the binder composition may be blended such that the group of binder particles is 0.1 part by mass to 10 parts by mass with respect to 100 parts by mass of the sulfide-based solid electrolyte. For example, the binder composition may be blended such that the group of binder particles is 0.5 parts by mass to 1.5 parts by mass with respect to 100 parts by mass of the sulfide-based solid electrolyte.

For example, a dispersion medium may be added to adjust the viscosity of the slurry composition. That is, the slurry composition may be prepared by mixing the binder composition, the sulfide-based solid electrolyte, and the dispersion medium. The fraction of the solid content of the slurry composition may be, for example, 40 mass % to 60 mass %. The fraction of the solid content of the slurry composition may be, for example, 45 mass % to 55 mass %. The fraction of the solid content of the slurry composition may be, for example, 50 mass % to 55 mass %. The "fraction of the solid content" in the present embodiment indicates the total of the mass fractions of the components other than the dispersion medium.

In the present embodiment, any stirrer, kneader, or dispersing device can be used. For example, the mixture in the container may be stirred by a rotary stirrer or the like. Thus, the slurry composition can be prepared. A mixing condition can be appropriately adjusted to attain a substantially uniform slurry composition.

(Sulfide-Based Solid Electrolyte)

The sulfide-based solid electrolyte is a group of particles. The sulfide-based solid electrolyte may have a median size of, for example, 0.1 µm to 10 µm. For example, the sulfide-based solid electrolyte may have a median size of 0.5 µm to 5 µm.

The sulfide-based solid electrolyte may have a specific surface area of, for example, less than or equal to 5.3 $m^2/g$. When the specific surface area of the sulfide-based solid electrolyte is less than or equal to 5.3 $m^2/g$, it is expected to attain small aggregating force of the sulfide-based solid electrolyte. The sulfide-based solid electrolyte may have a specific surface area of less than or equal to 4.8 $m^2/g$, for example. The sulfide-based solid electrolyte may have a specific surface area of more than or equal to 4.3 $m^2/g$, for example. The "specific surface area" in the present embodiment is measured by a BET multipoint method. The specific surface area is measured three or more times. The arithmetic mean value of results of measuring the specific surface area three or more times is employed.

The sulfide-based solid electrolyte may be in a glassy state, for example. The sulfide-based solid electrolyte may form, for example, a glass ceramic (also referred to as "crystallized glass"). The sulfide-based solid electrolyte at least includes lithium (Li) and sulfur (S). The sulfide-based solid electrolyte may further include phosphorus (P), iodine (I), bromine (Br), or the like, for example.

The sulfide-based solid electrolyte can be synthesized by a mechanochemical method. For example, raw materials are mixed by a planetary ball mill or the like. By applying mechanical energy to the mixture, the composition of the mixture becomes substantially uniform and the mixture is brought into a glassy state. Further, by applying appropriate heat treatment to the mixture in the glassy state, a glass ceramic can be formed.

The composition of the sulfide-based solid electrolyte can be represented by the amount of substance fractions (also referred to as "molar fractions") of the raw materials. The raw materials may include lithium phosphorus sulfide (for example, $Li_2S$—$P_2S_5$) and lithium halide (for example, LiI, LiBr, or the like), for example.

The composition of the sulfide-based solid electrolyte may be represented by, for example, the following formula:

$$vLiI\text{-}wLiBr\text{-}(100\text{-}v\text{-}w)(Li_2S\text{—}P_2S_5).$$

In the formula, "v" represents the amount of substance fraction (mol %) of a component originated from the lithium iodide (LiI). For example, "v" may satisfy the following relation: "$10 \leq v \leq 20$". For example, "v=10" indicates that the amount of substance fraction of LiI is 10 mol % with respect to the whole of the raw materials. For example, "v" may satisfy the following relation: "$10 \leq v \leq 15$". For example, "v" may satisfy the following relation: "$15 \leq v \leq 20$".

"w" represents the amount of substance fraction of a component originated from the lithium bromide (LiBr). For example, "w" may satisfy the following relation: "$0 \leq w \leq 15$". For example, "w=10" indicates that the amount of substance fraction of LiBr is 10 mol % with respect to the whole of the raw materials. For example, "w" may satisfy the following relation: "$0 \leq w \leq 10$". For example, "w" may satisfy the following relation: "$10 \leq w \leq 15$".

"(100-v-w)" represents the amount of substance fraction of a component originated from the lithium phosphorus sulfide ($Li_2S$—$P_2S_5$). For example, when "v=w=10", the amount of substance fraction of $Li_2S$—$P_2S_5$ is 80 mol % with respect to the whole of the raw materials. For example, "(100-v-w)" may satisfy the following relation: "$65 \leq (100\text{-}v\text{-}w) \leq 90$". For example, "(100-v-w)" may satisfy the following relation: "$70 \leq (100\text{-}v\text{-}w) \leq 80$".

For example, the sulfide-based solid electrolyte may include at least one selected from a group consisting of 10LiI-10LiBr-80($Li_2S$—$P_2S_5$),
15LiI-5LiBr-80($Li_2S$—$P_2S_5$),
20LiI-80($Li_2S$—$P_2S_5$),
10LiI-15LiBr-75($Li_2S$—$P_2S_5$),
15LiI-10LiBr-75($Li_2S$—$P_2S_5$),
20LiI-5LiBr-75($Li_2S$—$P_2S_5$),
15LiI-15LiBr-70($Li_2S$—$P_2S_5$), and
20LiI-10LiBr-70($Li_2S$—$P_2S_5$).

The lithium phosphorus sulfide ($Li_2S$—$P_2S_5$) can be generated by a mechanochemical reaction between lithium sulfide ($Li_2S$) and diphosphorus pentasulfide ($P_2S_5$). The lithium phosphorus sulfide may have a composition such as $Li_3PS_4$, $Li_4P_2S_6$, or $Li_7P_3S_{11}$, for example.

The composition of the lithium phosphorus sulfide may also be represented by the amount of substance fractions of the raw materials. In the present embodiment, the mixing ratio of $Li_2S$ and $P_2S_5$ is arbitrary. For example, "0.75$Li_2S$-0.25$P_2S_5$" indicates that the amount of substance fraction of the component originated from $Li_2S$ is 0.75 with respect to the whole of the raw materials of the lithium phosphorus sulfide and the amount of substance fraction of the component originated from $P_2S_5$ is 0.25 with respect to the whole of the raw materials of the lithium phosphorus sulfide. It should be noted that the whole of the raw materials of the lithium phosphorus sulfide (the total of $Li_2S$ and $P_2S_5$) herein is defined as 1.00.

The composition of the lithium phosphorus sulfide may be represented by, for example, the following formula:

$$uLi_2S\text{-}(1-u)P_2S_5.$$

In the above formula, "u" represents the amount of substance fraction of the component originated from $Li_2S_5$. "(1-u)" represents the amount of substance fraction of the component originated from $P_2S_5$. For example, "u" may satisfy the following relation: "$0.5 \le u \le 0.9$". For example, "u" may satisfy the following relation: "$0.6 \le u \le 0.8$". For example, "u" may satisfy the following relation: "$0.7 \le u \le 0.8$".

For example, the lithium phosphorus sulfide may include at least one selected from a group consisting of 0.5$Li_2S$-0.5$P_2S_5$, 0.6$Li_2S$-0.4$P_2S_5$, 0.65$Li_2S$-0.35$P_2S_5$, 0.70$Li_2S$-0.30$P_2S_5$, 0.75$Li_2S$-0.25$P_2S_5$, 0.80$Li_2S$-0.20$P_2S_5$, 0.85$Li_2S$-0.15$P_2S_5$, and 0.90$Li_2S$-0.10$P_2S_5$.

<<(B) Pulverizing of Aggregate>>

The method of producing the all-solid-state battery according to the present embodiment includes pulverizing the aggregate included in the slurry composition. By pulverizing the aggregate before applying the slurry composition, it is expected to attain small variation in the thickness of the separator, for example. After pulverizing the aggregate, the slurry composition may be filtered.

In the present embodiment, the aggregate can be pulverized by any method. For example, the aggregate may be pulverized by ultrasonic wave. For example, the slurry composition may be fed with the ultrasonic wave by an ultrasonic homogenizer or the like. When pulverizing the aggregate, the temperature of the slurry composition can be increased. For example, the aggregate may be pulverized to maintain the slurry composition at a temperature of less than or equal to 50° C.

A pulverizing time may be, for example, more than or equal to 10 minutes. The pulverizing time may be, for example, more than or equal to 30 minutes. The pulverizing time may be, for example, less than or equal to 120 minutes. The pulverizing time may be, for example, less than or equal to 60 minutes.

Figure 4:
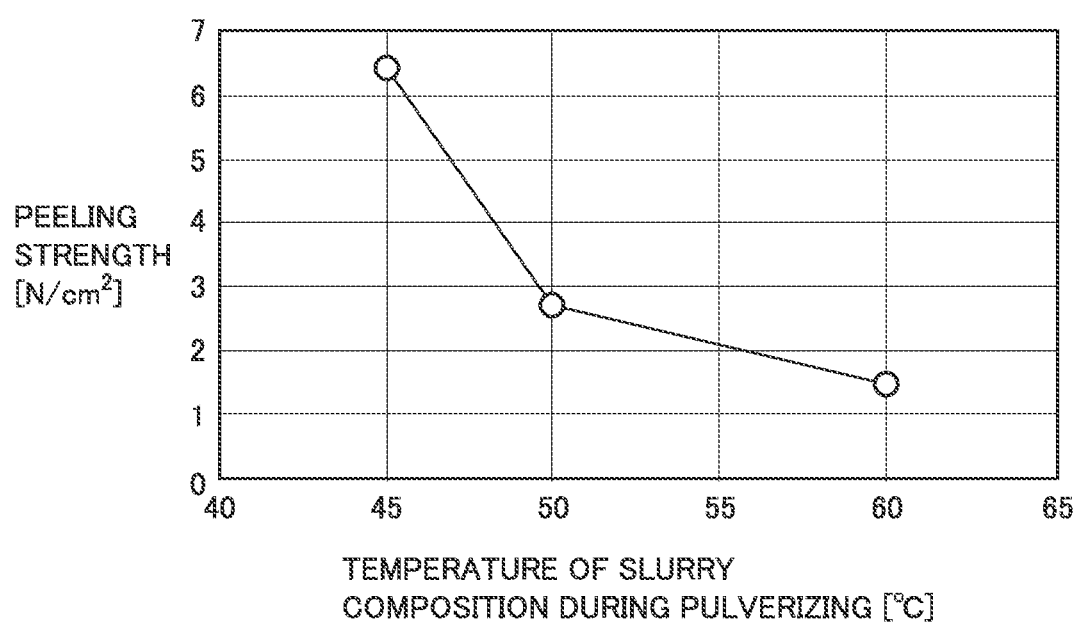
FIG. 4 is a graph showing a relation between a temperature of a slurry composition and the binding force.

FIG. 4 is a graph showing a relation between the temperature of the slurry composition and the binding force.

The horizontal axis represents the temperature of the slurry composition during the pulverizing of the aggregate. The vertical axis represents the peeling strength of the separator. It is considered that as the peeling strength is higher, the binding force of the group of binder particles is larger. In FIG. 4, it is observed that the binding force tends to be improved in the range of less than or equal to 50° C. The temperature of the slurry composition during the pulverizing of the aggregate may be, for example, less than or equal to 45° C. The temperature of the slurry composition during the pulverizing of the aggregate may be, for example, more than or equal to 40° C. and less than or equal to 45° C. The temperature of the slurry composition during the pulverizing of the aggregate may be, for example, more than or equal to 45° C. and less than or equal to 50° C.

It should be noted that the binder composition used in the slurry composition of FIG. 4 has been through the dispersing process for the group of binder particles ("(b) the dispersing of the group of binder particles" above) at 45° C.

Figure 5:
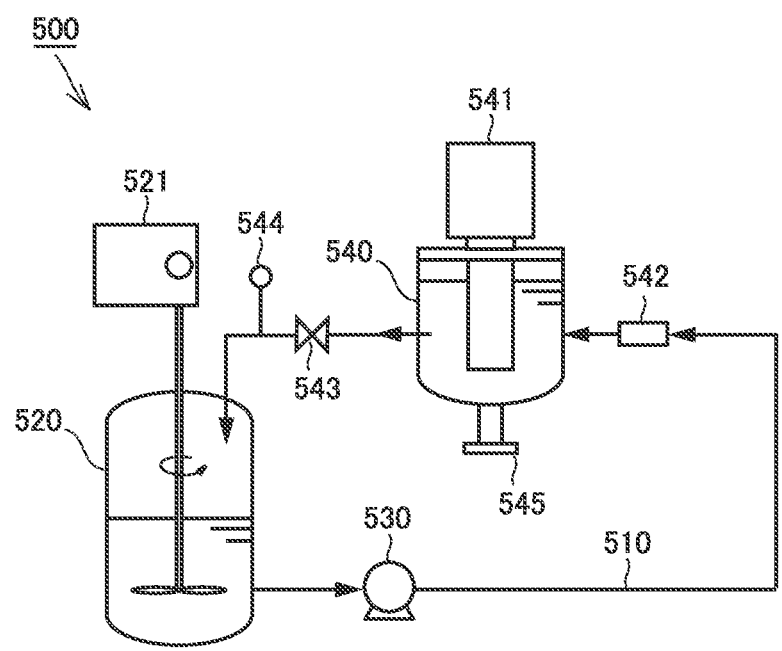
FIG. 5 is a conceptual diagram showing an exemplary production device for the slurry composition.

FIG. 5 is a conceptual diagram showing an exemplary production device for the slurry composition.

For example, the mixing of the materials and the pulverizing of the aggregate may be performed alternately. A production device 500 includes a loop pipe 510, a mixing chamber 520, a fluid sending pump 530, and a pulverization chamber 540. Mixing chamber 520 and pulverization chamber 540 are disposed in the loop of loop pipe 510. By circulating the slurry composition through loop pipe 510, the mixing of the materials and the pulverizing of the aggregate can be performed alternately.

First, the binder composition, the sulfide-based solid electrolyte, and the dispersion medium are introduced into mixing chamber 520. In mixing chamber 520, the materials are mixed by, for example, a stirrer 521. In this way, the slurry composition is prepared. Stirrer 521 may include, for example, a ball turbine or the like. Mixing chamber 520 may include, for example, a water-cooled jacket or the like.

The slurry composition sent out from mixing chamber 520 is sent to pulverization chamber 540 by fluid sending pump 530. Fluid sending pump 530 may be, for example, a diaphragm pump or the like.

In pulverization chamber 540, the aggregate included in the slurry composition is pulverized by, for example, an ultrasonic homogenizer 541. Pulverization chamber 540 may be cooled by, for example, a chiller. A mesh filter 542 or the like may be disposed just before pulverization chamber 540. The slurry composition can be filtered by mesh filter 542. Mesh filter 542 may have a sieve opening of, for example, about 30 μm to 50 μm.

The slurry composition sent out from pulverization chamber 540 is sent to mixing chamber 520 again. For example, a valve 543 or the like may be disposed between pulverization chamber 540 and mixing chamber 520. For example, a temperature sensor 544 or the like may be disposed between pulverization chamber 540 and mixing chamber 520. Temperature sensor 544 measures the temperature of the slurry composition.

The slurry composition circulates through loop pipe 510 for a predetermined time. The temperature of the slurry composition may be managed to avoid the temperature of the slurry composition from becoming more than 50° C. during the circulation. After the circulation, the slurry composition is removed from a removal port 545. After the removal, the slurry composition is sent to, for example, an applicator or the like.

<<(C) Forming of Separator>>

The method of producing the all-solid-state battery according to the present embodiment includes forming the separator by applying the slurry composition to the surface of the substrate and drying the slurry composition after pulverizing the aggregate. In the present embodiment, it is expected to attain small variation in the thickness of the separator. This is presumably because the aggregate is less likely to be formed in the process of forming the separator.

In the present embodiment, the slurry composition can be applied by any applicator. For example, a slot die coater, a gravure coater, a doctor blade, or the like may be used.

In the present embodiment, the slurry composition can be dried by any dryer. For example, a hot air dryer, a hot plate, an infrared dryer, or the like may be used. A drying condition can be selected in accordance with the type of the dispersion medium or the like. A drying temperature may be, for example, 130° C. to 170° C.

The substrate may be, for example, a temporary support. The temporary support may be, for example, a metal foil or the like. The metal foil may be, for example, an aluminum (Al) foil, a nickel (Ni) foil, or the like. For example, by applying the slurry composition to the surface of the temporary support and drying the slurry composition, the separator may be formed on the surface of the temporary support. After forming the separator, the separator may be transferred from the surface of the temporary support to a surface of an electrode, for example.

The substrate may be, for example, an electrode. By applying the slurry composition directly to a surface of the electrode and drying the slurry composition, the separator may be formed on the surface of the electrode. For example, the separator may be formed on a surface of one of the positive electrode and the negative electrode. For example, the separator may be formed on each of the surfaces of the positive electrode and the negative electrode.

<<(D) Producing of All-Solid-State Battery>>

The method of producing the all-solid-state battery according to the present embodiment includes producing the all-solid-state battery including the separator. In the all-solid-state battery according to the present embodiment, it is expected to reduce discharging resistance. This is presumably because the variation in the thickness of the separator is small.

Figure 6:
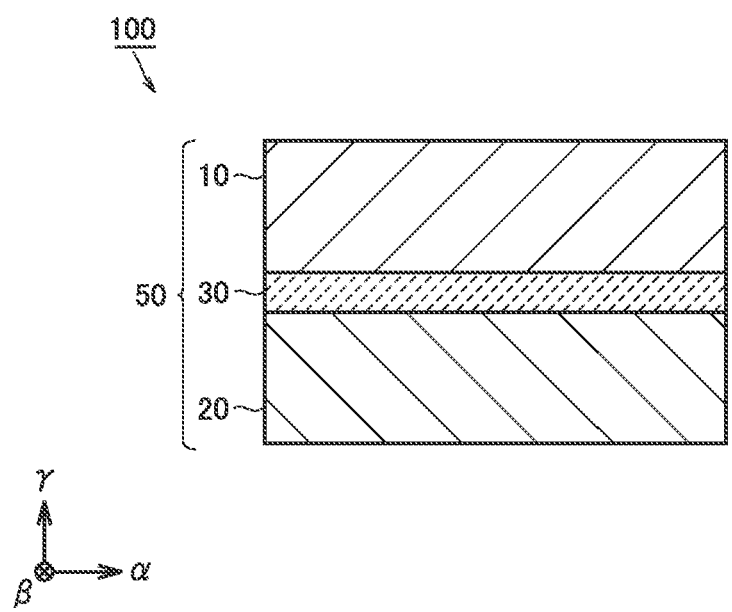
FIG. 6 is a conceptual cross sectional view of the all-solid-state battery according to the present embodiment.

FIG. 6 is a conceptual cross sectional view of the all-solid-state battery according to the present embodiment.

For example, a positive electrode 10, a separator 30, and a negative electrode 20 may be stacked in this order to form a battery element 50. For example, battery element 50 may be made dense by hot pressing. For example, by accommodating battery element 50 in a case (not shown), an all-solid-state battery 100 can be produced.

The case may be, for example, a pouch composed of an Al laminate film. Battery element 50 includes positive electrode 10, separator 30, and negative electrode 20. That is, all-solid-state battery 100 includes separator 30. Each of positive electrode 10, separator 30, and negative electrode 20 may have a thickness of, for example, 1 μm to 1000 μm.

Separator 30 is interposed between positive electrode 10 and negative electrode 20. Separator 30 spatially separates positive electrode 10 and negative electrode 20 from each other. Separator 30 blocks electron conduction between positive electrode 10 and negative electrode 20. Separator 30 forms an ion conduction path between positive electrode 10 and negative electrode 20.

All-solid-state battery 100 may include one battery element 50 solely. All-solid-state battery 100 may include a plurality of battery elements 50. The plurality of battery elements 50 may be stacked in a y axis direction of FIG. 6. The plurality of battery elements 50 may form a series circuit, for example. The plurality of battery elements 50 may form a parallel circuit, for example.

(Positive Electrode)

Positive electrode 10 is an electrode having a potential higher than that of negative electrode 20. Positive electrode 10 can be formed by applying a slurry composition, for example. For example, positive electrode 10 can be formed by applying the slurry composition to a surface of a positive electrode collector (not shown) and drying the slurry composition. The positive electrode collector may be, for example, an Al foil or the like. The positive electrode collector may have a thickness of, for example, 5 μm to 50 μm.

The slurry composition for forming the positive electrode can be prepared, for example, by mixing a positive electrode active material, a sulfide-based solid electrolyte, a conductive material, and a binder solution.

The positive electrode active material may be, for example, a group of particles. The positive electrode active material may have a median size of, for example, 1 μm to 30 μm. The positive electrode active material can include any component. For example, the positive electrode active material may include at least one selected from a group consisting of lithium cobalt oxide, lithium nickel oxide, lithium manganese oxide, lithium nickel cobalt manganese oxide (for example, $LiN_{1/3}Co_{1/3}Mn_{1/3}O_2$ or the like), lithium nickel cobalt aluminum oxide (for example, $LiNi_{0.8}Co_{0.15}Al_{0.05}O_2$ or the like), and lithium iron phosphate. Surface treatment may be provided to the positive electrode active material. By the surface treatment, a buffer layer may be formed on the surface of the positive electrode active material. The buffer layer may include lithium niobium oxide ($LiNbO_3$) or the like, for example. The buffer layer can inhibit formation of a Li depletion layer. Thus, it is expected to reduce discharging resistance.

The sulfide-based solid electrolyte included in positive electrode 10 may have the same composition as that of the sulfide-based solid electrolyte included in separator 30, for example. The conductive material can include any component. The conductive material may include, for example, carbon black, vapor grown carbon fiber (VGCF), or the like. The binder solution includes a solvent and a binder. The solvent may include, for example, butyl butyrate or the like. The binder is dissolved in the solvent. The binder may include, for example, PVdF or the like.

(Negative Electrode)

Negative electrode 20 is an electrode having a potential lower than that of positive electrode 10. Negative electrode 20 can be formed by applying a slurry composition, for example. For example, negative electrode 20 can be formed by applying the slurry composition to a surface of a negative electrode collector (not shown) and drying the slurry composition. The negative electrode collector may be, for example, a Ni foil, a copper (Cu) foil, or the like. The negative electrode collector may have a thickness of, for example, 5 μm to 50 μm.

The slurry composition for forming the negative electrode can be prepared, for example, by mixing a negative electrode active material, a sulfide-based solid electrolyte, a conductive material, and a binder solution.

The negative electrode active material may be, for example, a group of particles. The negative electrode active material may have a median size of, for example, 1 μm to 30 μm. The negative electrode active material may include any component. The negative electrode active material may include, for example, at least one selected from a group consisting of lithium titanate, graphite, soft carbon, hard carbon, silicon, silicon oxide, a silicon-based alloy, tin, tin oxide, and a tin-based alloy. The same sulfide-based solid electrolyte, conductive material, and binder solution may be used for each of positive electrode 10 and negative electrode 20, for example.

EXAMPLES

The following describes examples of the present disclosure (hereinafter, also referred to as "present examples"). However, the description below does not limit the scope of the claims.

<No. 1-1>

A binder composition was produced in the following procedure.

<<(a) Preparing of Binder Composition>>

The following materials were prepared.

Dispersion medium: butyl butyrate

Group of binder particles: PVdF powder

A glass container (separable flask) was prepared. The dispersion medium and the group of binder particles were introduced into the container. The mass fraction of the group of binder particles was 10 mass % with respect to the total of the dispersion medium and the group of binder particles. In the container, the dispersion medium and the group of binder particles were mixed to prepare the binder composition. The binder composition was rested for 8 hours.

<<(b) Dispersing of Group of Binder Particles>>

The binder composition was stirred by an ultrasonic homogenizer. By the stirring, the temperature of the binder composition was increased to 35° C. Thereafter, the stirring was continued for 1 hour to maintain the binder composition at a temperature of 35° C. In this way, the binder composition of No. 1-1 was produced.

<No. 1-2>

The binder composition was stirred by an ultrasonic homogenizer. By the stirring, the temperature of the binder composition was increased to 45° C. Thereafter, the stirring was continued for 1 hour to maintain the binder composition at a temperature of 45° C. Except for these, the binder composition of No. 1-2 was produced in the same manner as in No. 1-1.

<No. 1-3>

The binder composition was stirred by an ultrasonic homogenizer. By the stirring, the temperature of the binder composition was increased to 55° C. Thereafter, the stirring was continued for 1 hour to maintain the binder composition at a temperature of 55° C. Except for these, the binder composition of No. 1-3 was produced in the same manner as in No. 1-1.

(Measuring of Particle Size Distribution)

A particle size distribution in each of No. 1-1 to No. 1-3 was measured in accordance with the above-described measurement method. Measurement results are shown in Table 1 below.

TABLE 1

| | Particle Size Distribution (Number-Based) | | |
|---|---|---|---|
| No. | D ≤ 40 μm<br>X | 40 μm < D ≤ 110 μm<br>Y | 110 μm < D ≤ 250 μm<br>Z |
| 1-1 | 0.13 | 0.41 | 0.46 |
| 1-2 | 0.19 | 0.76 | 0.05 |
| 1-3 | 0.26 | 0.69 | 0.05 |

Figure 7:
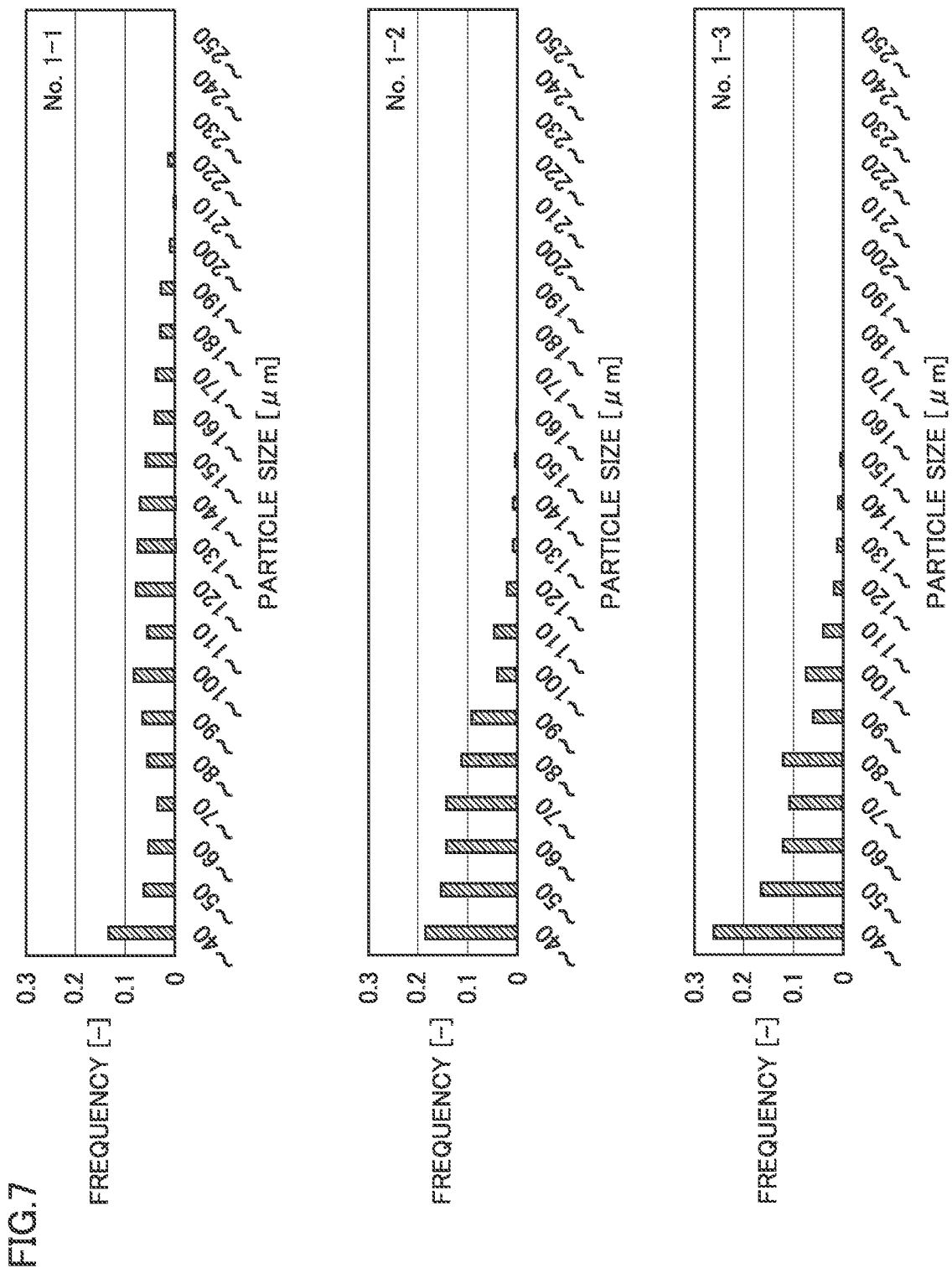
FIG. 7 shows graphs showing particle size distributions of No. 1-1 to No. 1-3.

FIG. 7 shows graphs showing the particle size distributions in No. 1-1 to No. 1-3.

The binder composition of No. 1-1 tended to have a large amount of coarse particles. The term "coarse particle" in the present examples indicates a particle having a particle size of more than 110 μm. The binder composition of No. 1-2 tended to have a large amount of middle-range particles. The term "middle-range particle" in the present examples indicates a particle having a particle size of more than 40 μm and less than or equal to 110 μm. The binder composition of No. 1-3 tended to have a large amount of fine particles. The term "fine particle" in the present examples indicates a particle having a particle size of less than or equal to 40 μm.

<No. 2-1>

An all-solid-state battery was produced in the following procedure. A sulfide-based solid electrolyte in each of the present examples formed a glass ceramic.

<<(A) Preparing of Slurry Composition>>

The following materials were prepared.

Binder composition: the binder composition of No. 1-1 (produced above)

Sulfide-based solid electrolyte: 10LiI-10LiBr-80 (0.75Li$_2$S-0.25P$_2$S$_5$); specific surface area of 4.8 m$^2$/g Dispersion medium: butyl butyrate A slurry composition was prepared by mixing the binder composition, the sulfide-based solid electrolyte, and the dispersion medium. The fraction of the solid content of the slurry composition was 50 mass %. The mass fraction of the group of binder particles with respect to the sulfide-based solid electrolyte was 1 mass %.

<<(B) Pulverizing of Aggregate>>

The slurry composition was fed with ultrasonic wave by an ultrasonic homogenizer. Thus, an aggregate included in the slurry composition was pulverized. A pulverizing time was more than or equal to 30 minutes.

(Evaluation by Grind Gauge)

After pulverizing the aggregate, the slurry composition was evaluated by a grind gauge.

A grind gauge in accordance with "JIS K 5600-2-5" was prepared. The slurry composition was placed in a groove of the grind gauge. A scraper was pulled on a surface of the grind gauge, thereby forming a particle pattern. The calibration marking at the position of the particle at the first one point was read. The value of the calibration marking on this occasion is shown in the column "Maximum Value" in Table 2 below. The "maximum value" is considered to reflect the size of the aggregate. Then, the calibration making at a position at which particles start to be collected densely was read. The value of the calibration marking on this occasion is shown in the column "Representative Value" in Table 2 below. The "representative value" is considered to reflect a frequency of generation of aggregates. It should be noted that ">100" in Table 2 below indicates that 100 μm is exceeded.

<<(C) Forming of Separator>>

After pulverizing the aggregate, the slurry composition was applied to a surface of a temporary support by a doctor blade type applicator. The temporary support was an Al foil. The applied film was dried by a hot air dryer. A hot air temperature was 150° C. By drying the applied film, a separator was formed.

Presence or absence of a granular aggregate on the surface of the separator was visually checked. Check results are shown in the column "Presence/Absence of Granular Aggregate" in Table 2 below.

<<(D) Producing of All-Solid-State Battery>>

(Forming of Negative Electrode)

The following materials were prepared.

Negative electrode active material: lithium titanate

Sulfide-based solid electrolyte: 10LiI-10LiBr-80 (0.75Li$_2$S-0.25P$_2$S$_5$)

Conductive material: VGCF

Binder solution: PVdF (mass fraction of 5 mass %) as a solute; butyl butyrate as a solvent Dispersion medium: butyl butyrate A PP container was prepared. The above-described materials were placed in the PP container at a predetermined blending ratio. In the PP container, the materials were stirred for 30 seconds by an ultrasonic dispersing device. After the stirring, the PP container was set to a shaker. The PP container was shaken by the shaker for 30 minutes. Thus, a slurry composition for forming the negative electrode was prepared.

A negative electrode collector (Ni foil) was prepared. The slurry composition was applied to a surface of the negative electrode collector by a doctor blade type applicator. The slurry composition was dried on a hot plate for 30 minutes. The temperature of the hot plate was 100° C. In this way, the negative electrode was formed on the surface of the negative electrode collector.

(Forming of Positive Electrode)

The following materials were prepared.

Positive electrode active material: $LiNi_{1/3}Co_{1/3}Mn_{1/3}O_2$, $LiNbO_3$

Sulfide-based solid electrolyte: $10LiI-10LiBr-80(0.75Li_2S-0.25P_2S_5)$

Conductive material: VGCF

Binder solution: PVdF (mass fraction of 5 mass %) as a solute; butyl butyrate as a solvent Dispersion medium: butyl butyrate A surface of $LiNi_{1/3}Co_{1/3}Mn_{1/3}O_2$ (particle) was coated with $LiNbO_3$, thereby forming a buffer layer. Thus, a positive electrode active material was prepared.

A PP container was prepared. The above-described materials were placed in the PP container at a predetermined blending ratio. In the PP container, the materials were stirred for 30 seconds by an ultrasonic dispersing device. After the stirring, the PP container was set in a shaker. The PP container was shaken by the shaker for 30 minutes. Thus, a slurry composition for forming the positive electrode was prepared.

A temporary support (Al foil) was prepared. The slurry composition was applied to a surface of the temporary support by a doctor blade type applicator. The slurry composition was dried on a hot plate for 30 minutes. The temperature of the hot plate was 100° C. In this way, the positive electrode was formed on the surface of the temporary support.

(Forming of Battery Element)

The separator was adhered to the negative electrode, thereby forming a first stack. In the first stack, the members were stacked in the following order: "the negative electrode/the separator/the temporary support (Al foil)".

The first stack was pressed by a roll press device. A pressing temperature was 25° C. A pressing line pressure was 1 ton/cm ($1 \times 10^3$ kg/cm). Thus, the negative electrode and the separator were bonded to each other. After the pressing, the temporary support (Al foil) was peeled from the separator. In this way, a second stack was formed. In the second stack, the members were stacked in the following order: "the negative electrode/the separator".

By bonding the positive electrode to the separator, a third stack was formed. In the third stack, the members were stacked in the following order: "the negative electrode/the separator/the positive electrode/the temporary support (Al foil)".

The third stack was pressed by a roll press device. A pressing temperature was 25° C. A pressing line pressure was 1 ton/cm. Thus, the separator and the positive electrode were bonded to each other. After the pressing, the temporary support (Al foil) was peeled from the positive electrode. In this way, a battery element was formed. In the battery element, the members were stacked in the following order: "the negative electrode/the separator/the positive electrode".

The battery element was pressed by a roll press device. A pressing temperature was 150° C. A pressing line pressure was 4 ton/cm. Thus, the battery element was made dense. After making the battery element dense, a positive electrode collector (Al foil) was bonded to the positive electrode. Further, the battery element was sealed in a case (pouch composed of an Al laminate film). In this way, an all-solid-state battery (all-solid-state lithium ion battery) according to No. 2-1 was produced.

(Measuring of Discharging Resistance)

The periphery of the all-solid-state battery was constrained to apply a pressure of 5 MPa to the battery element. After the constraining, the all-solid-state battery was placed in a thermostatic chamber. A setting temperature of the thermostatic chamber was 25° C. The all-solid-state battery was connected to a charging/discharging device. The all-solid-state battery was charged and discharged with a current value of 0.3 C. After the charging and discharging, the SOC (state of charge) of the all-solid-state battery was adjusted to 50%. After adjusting the SOC, the all-solid-state battery was discharged for 10 seconds with a current value of 7 C. Discharging resistance was calculated in accordance with a relation between an amount of voltage decrease during 10 seconds of the discharging and the current value. The discharging resistance is shown in Table 2 below.

It should be noted that in the present example, "C" is a symbol representing a hour rate. When the current value is of a hour rate of 1 C, the fully charged capacity of the battery is discharged in one hour.

<No. 2-2>

An all-solid-state battery was produced in the same manner as in No. 2-1 except that the specific surface area of the sulfide-based solid electrolyte was changed as shown in Table 2.

<No. 2-3>

An all-solid-state battery was produced in the same manner as in No. 2-1 except that the binder composition of No. 1-2 was used instead of the binder composition of No. 1-1 and the specific surface area of the sulfide-based solid electrolyte was changed as shown in Table 2.

<No. 2-4 to No. 2-6>

Each of all-solid-state batteries was produced in the same manner as in No. 2-3 except that the specific surface area of the sulfide-based solid electrolyte was changed as shown in Table 2.

<No. 2-7>

An all-solid-state battery was produced in the same manner as in No. 2-3 except that the binder composition of No. 1-3 was used instead of the binder composition of No. 1-2 as shown in Table 2. In No. 2-7, the all-solid-state battery was short-circuited in the production process. Hence, the discharging resistance was not measured.

<No. 2-8>

An all-solid-state battery was produced in the same manner as in No. 2-5 except that the binder composition of No. 1-3 was used instead of the binder composition of No. 1-2 as shown in Table 2.

TABLE 2

| | | Slurry Composition | | | | All-Solid-State Battery Discharging |
|---|---|---|---|---|---|---|
| | | Sulfide-Based Solid Electrolyte | Grind Gauge | | Separator Quality of Applied Film | |
| No. | Binder Composition No. | Specific Surface Area [m²/g] | Maximum Value [μm] | Representative Value μm | Presence/Absence of Granular Aggregate | resistance SOC = 50% [Ω] |
| 2-1 | 1-1 | 4.8 | 80 | 65 | Present | 21 |
| 2-2 | 1-1 | 5.3 | 75 | 65 | Present | 22 |
| 2-3 | 1-2 | 6.0 | 95 | 80 | Present | 28 |
| 2-4 | 1-2 | 5.3 | 40 | 40 | Absent | 17 |
| 2-5 | 1-2 | 4.8 | 40 | 40 | Absent | 18 |
| 2-6 | 1-2 | 4.3 | 40 | 40 | Absent | 17 |
| 2-7 | 1-3 | 6.0 | >100 | >100 | Present | — |
| 2-8 | 1-3 | 4.8 | 50 | 40 | Absent | 18 |

<Results>

In each of the results of No. 2-1, No. 2-5, and No. 2-8, it is observed that with each of the binder compositions of No. 1-2 and No. 1-3, an aggregate tends to be less likely to be formed as compared with the case of the binder composition of No. 1-1.

In each of the results of No. 2-2 and No. 2-4, it is observed that with the binder composition of No. 1-2, an aggregate tends to be less likely to be formed as compared with the case of the binder composition of No. 1-1.

Each of the binder compositions of No. 1-2 and No. 1-3 satisfies the above-described formulae (1) to (3). The binder composition of No. 1-1 does not satisfy the above-described formulae (1) to (3).

One of conceivable reasons why an aggregate is likely to be generated when the binder composition of No. 1-1 is used is that a coarse particle is likely to be a nucleus of the aggregate, for example.

In each of the results of No. 2-3 to No. 2-6, it is observed that when the specific surface area of the sulfide-based solid electrolyte is less than or equal to 5.3 m²/g, an aggregate tends to be less likely to be formed. It is considered that when the specific surface area of the sulfide-based solid electrolyte is less than or equal to 5.3 m²/g, the aggregating force of the sulfide-based solid electrolyte is small.

It is observed that when no granular aggregate is confirmed in the separator (applied film), the discharging resistance of the all-solid-state battery tends to be low. In each of the results of No. 2-3, No. 2-5, No. 2-7, and No. 2-8, it is observed that when the amount of fine particles is large, the aggregate tends to be grown to be large.

The present embodiment and the present examples are illustrative in any respects. The present embodiment and the present examples are not restrictive. For example, it is initially expected to extract freely configurations from the present embodiment and the present examples and combine them freely.

The technical scope defined by the terms of the claims encompasses any modification within the meaning equivalent to the terms of the claims. The technical scope defined by the terms of the claims also encompasses any modification within the scope equivalent to the terms of the claims.

What is claimed is:

1. A method of producing an all-solid-state battery, the method comprising:
   preparing a slurry composition by mixing a binder composition with a sulfide-based solid electrolyte;
   pulverizing an aggregate included in the slurry composition;
   forming a separator by applying the slurry composition to a surface of a substrate and drying the slurry composition after pulverizing the aggregate; and
   producing an all-solid-state battery including the separator, wherein
   said binder composition consists essentially of 1 mass % to 15 mass % of a group of binder particles and the remainder of a dispersion medium,
   the group of binder particles is dispersed in the dispersion medium,
   the group of binder particles includes a polymer material,
   the polymer material includes a constitutional unit originated from vinylidene difluoride,
   the group of binder particles has a number-based particle size distribution, and
   the number-based particle size distribution satisfies conditions of the following formulae (1) to (3):

$$0.19 \leq X \leq 0.26 \quad (1),$$

$$0.69 \leq Y \leq 0.76 \quad (2), \text{ and}$$

$$0 \leq Z \leq 0.05 \quad (3)$$

where
   in the formula (1), X represents a frequency of particles each having a particle size of less than or equal to 40 μm,
   in the formula (2), Y represents a frequency of particles each having a particle size of more than 40 μm and less than or equal to 110 μm, and
   in the formula (3), Z represents a frequency of particles each having a particle size of more than 110 μm and less than or equal to 250 μm.

2. The method of producing the all-solid-state battery according to claim 1, wherein the sulfide-based solid electrolyte has a specific surface area of less than or equal to 5.3 m²/g.

3. The method of producing the all-solid-state battery according to claim 1, wherein the aggregate is pulverized to maintain the slurry composition at a temperature of less than or equal to 50° C.

4. The method of producing the all-solid-state battery according to claim 1, wherein the aggregate is pulverized by ultrasonic wave.

5. The method of claim 1, wherein the dispersion medium includes butyl butyrate.

* * * * *